(12) United States Patent
Casagrande et al.

(10) Patent No.: US 8,774,748 B2
(45) Date of Patent: Jul. 8, 2014

(54) RECEIVER FOR FSK RADIO FREQUENCY SIGNALS WITH HIGH SENSITIVITY DEMODULATOR AND METHOD FOR ACTIVATING THE SAME

(75) Inventors: Arnaud Casagrande, Bole (CH); Jean-Luc Arend, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 13/331,720

(22) Filed: Dec. 20, 2011

(65) Prior Publication Data

US 2012/0164966 A1    Jun. 28, 2012

(30) Foreign Application Priority Data

Dec. 23, 2010  (EP) ..................................... 10196893

(51) Int. Cl.
  *H04B 1/26*  (2006.01)
(52) U.S. Cl.
  USPC ........... 455/318; 455/323; 375/272; 375/343; 375/334; 375/335
(58) Field of Classification Search
  USPC .......... 455/318, 323; 375/133, 219, 335, 334, 375/343, 272
  See application file for complete search history.

(56) References Cited

U.S. PATENT DOCUMENTS

| 4,518,922 | A   | * | 5/1985  | Luecke ........................ 329/302 |
| 5,748,036 | A   |   | 5/1998  | Lee et al. |
| 5,974,094 | A   | * | 10/1999 | Fines et al. ..................... 375/335 |
| 6,690,662 | B1  | * | 2/2004  | Komara et al. ................ 370/342 |
| 7,804,887 | B2  | * | 9/2010  | Page ............................. 375/219 |
| 2003/0203729 | A1 | * | 10/2003 | Hansen et al. ................. 455/318 |
| 2004/0190663 | A1 |   | 9/2004  | Carsello et al. |
| 2006/0056493 | A1 | * | 3/2006  | Cornwall et al. ............. 375/133 |

FOREIGN PATENT DOCUMENTS

WO    WO 96/32797 A1    10/1996

OTHER PUBLICATIONS

Eugene Grayver et al., "A Low Power FSK Receiver for Space Applications", IEEE 23-28, Wireless Communications and Networking Conference, 2000, pp. 713-718, vol. 2.
European Search Report dated May 24, 2011.

* cited by examiner

*Primary Examiner* — Junpeng Chen
(74) *Attorney, Agent, or Firm* — Sughrue Mion, PLLC

(57) ABSTRACT

The high sensitivity FSK radiofrequency signal receiver includes an antenna for receiving FSK radiofrequency signals, a LNA amplifier receiving signals picked up by the antenna, a local oscillator for supplying oscillating signals, a mixer for mixing the incoming signals with the oscillating signals to produce intermediate signals. The receiver includes a broadband or poly-phase filter for filtering the intermediate signals, and a sampler for supplying sampled intermediate signals to a high sensitivity demodulation stage, which supplies data signals. The receiver includes a processing circuit for performing a discrete Fourier transform of sampled intermediate signals. The selector at the processing circuit output determines the difference between the signal amplitude peak frequency above a determined threshold and the expected frequency of the intermediate signals. The frequency difference enables for correcting the oscillating signals frequency, to enable the demodulation stage to demodulate the data in the sampled intermediate signals and supply data signals.

14 Claims, 4 Drawing Sheets

Figure 1:
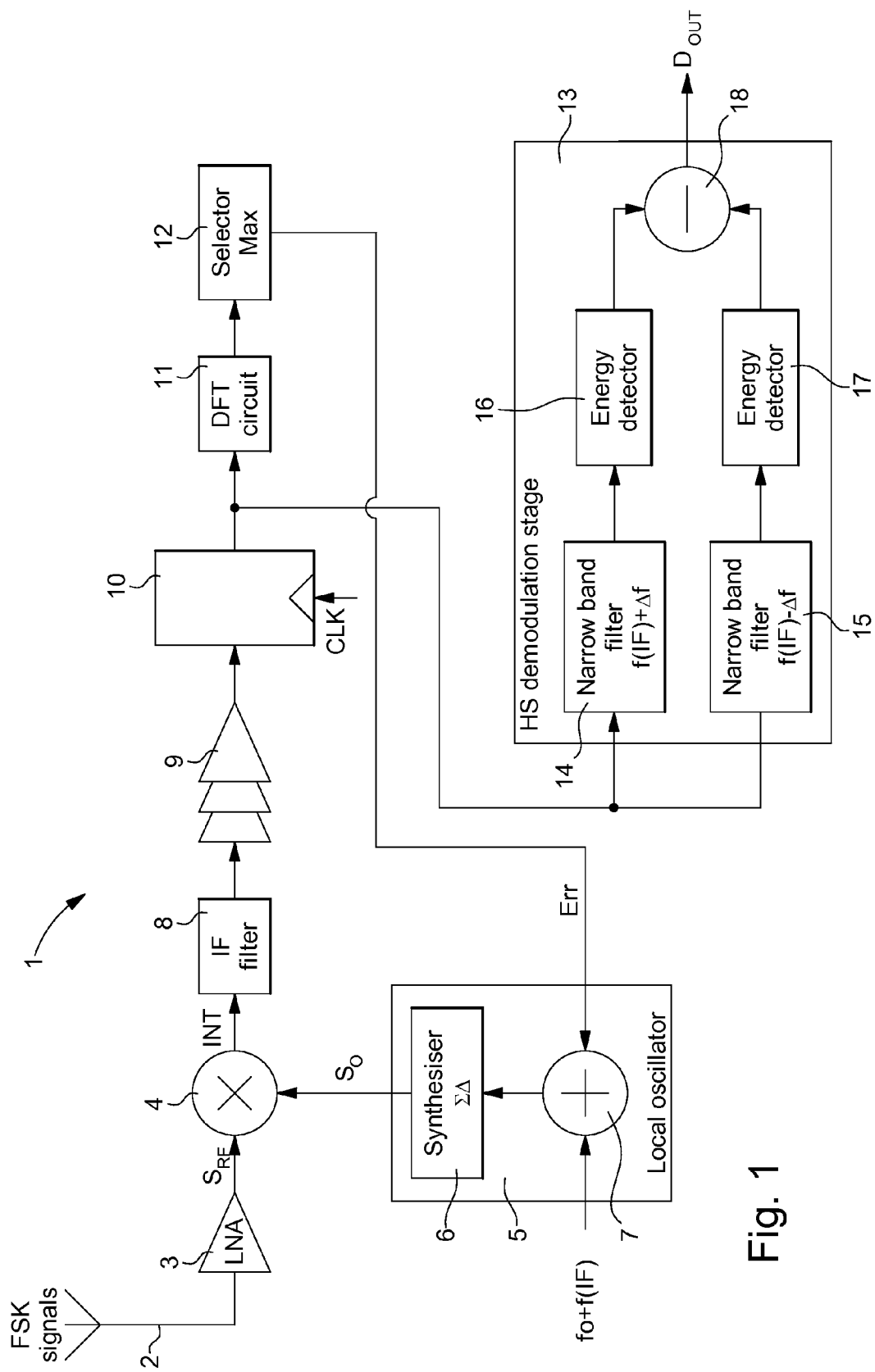

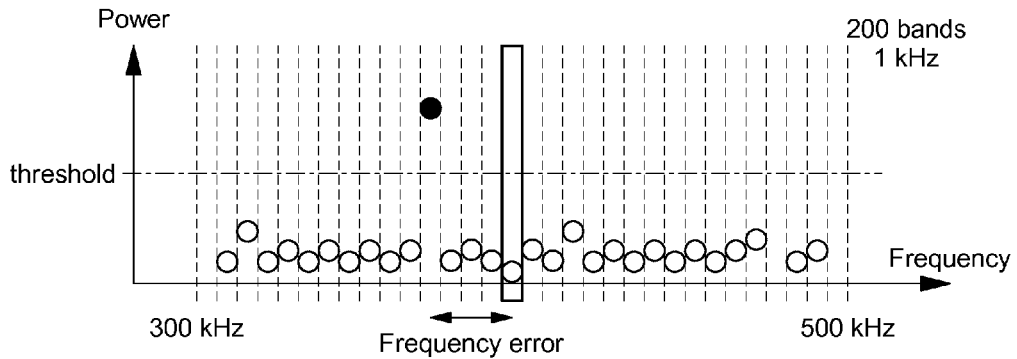
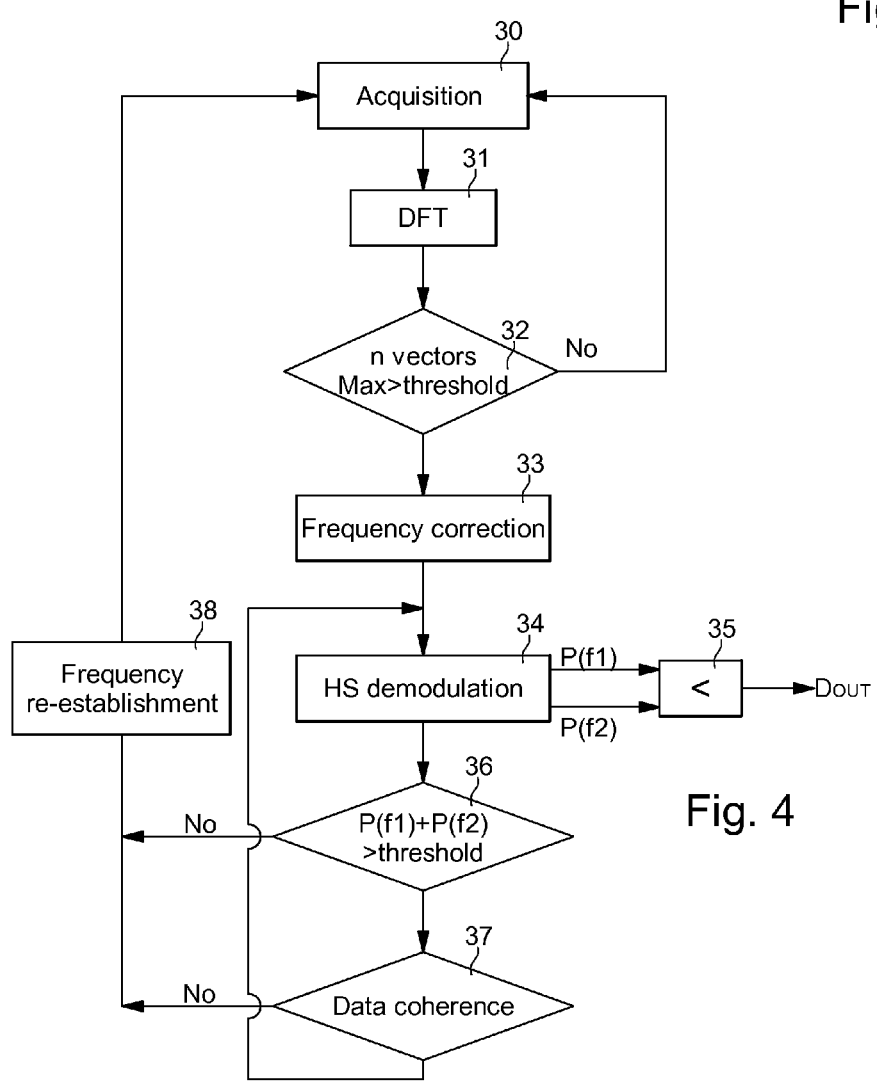
Fig. 3
Fig. 4

RECEIVER FOR FSK RADIO FREQUENCY SIGNALS WITH HIGH SENSITIVITY DEMODULATOR AND METHOD FOR ACTIVATING THE SAME

This application claims priority from European Patent Application No. 10196893.1 filed Dec. 23, 2010, the entire disclosure of which is incorporated herein by reference.

FIELD OF THE INVENTION

The invention concerns a receiver for FSK radio frequency signals with a high sensitivity demodulator.

The invention also concerns a method of activating the receiver for FSK radio frequency signals with a high sensitivity demodulator.

BACKGROUND OF THE INVENTION

For data or command transmission or reception, for example within a short range, a conventional transmitter or receiver uses frequency shift keying. If the RF carrier frequency is high, for example on the order of 2.4 GHz, a relatively high bandwidth is selected for the intermediate frequency, in particular, higher than or equal to 200 kHz. The modulation frequency deviation in the modulated signals can be adapted according to the bandwidth. In such case, a frequency reference may be used, provided by a local oscillator, which might not be very precise and is thus inexpensive. However, account must be taken of the power of thermal noise, which is proportional to the selected bandwidth. Thus, a broadband transmission or reception system generally does not have excellent sensitivity.

When a local oscillator with an inexpensive quartz is used, the frequency of the oscillating signals provided by the oscillator may vary by around ±20 ppm. For frequency conversion via a mixer unit with incoming radio frequency signals at 2.4 GHz, the frequency error in the oscillating signals produced by the local oscillator may thus be around ±100 kHz. In order to increase the sensitivity of the receiver, it may be preferable to use radio frequency signals with a low data rate, for example on the order of 1 kbit per second. However, even if the intermediate signals provided by the mixer unit are immediately subjected to lowpass or bandpass filtering, this does not allow precise filtering to be subsequently performed to obtain a high sensitivity receiver. With precise filtering by means of narrow band filters, the intermediate signal frequency is likely to be outside the frequency bands of the narrow band bandpass filters. In these conditions, the data or commands in the incoming radio frequency signals cannot all be extracted after the demodulation stage, which is a drawback. It is thus generally difficult to use an inexpensive quartz, if it is hoped to perform data demodulation after narrow band bandpass filtering. The frequency error in the intermediate signals would definitely have to be corrected.

In the case of a high data rate PSK (phase shift keying) radio frequency signal receiver, a synchronous approach to data demodulation is possible. This differs from the receiver of the present invention, which uses an asynchronous, and thus uncorrelated approach.

WO Patent Application No. 96/32797 A1 discloses an MFSK radio frequency signal receiver. This receiver takes account of the effects linked to the movement of the receiver and obstacles on the path of the transmitted radio frequency signals. The receiver can receive a signal at a carrier frequency within a determined frequency range. The incoming signals are amplified and filtered prior to frequency conversion in mixers by in-phase and quadrature oscillating signals from a local oscillator. Intermediate in-phase and quadrature signals at the outputs of the mixers are filtered by lowpass filters prior to being sampled, each in respective samplers. A set of N samples is stored in a buffer memory. A discrete Fourier transform (DFT) is performed on the N samples stored and the result of the discrete Fourier transform is stored in a buffer output memory. The local oscillator frequency is not adjusted, which prevents the intermediate signal frequency from being centred. Consequently, high sensitivity data demodulation cannot be performed, which is a drawback.

US Patent Application No. 2003/0203729 A1 mainly discloses frequency compensation in a GFSK radio frequency signal receiver. The frequency of the incoming radio frequency signals may be between 2.4 and 2.4835 GHz, on the order of 2.4 GHz on the Bluetooth network. The local oscillator frequency must be adjusted to remove any frequency deviation relative to the frequency of the incoming signals. To achieve this, an incoming signal peak detector is provided to determine a maximum positive peak value and a maximum negative peak value for the incoming RF signals. The middle point between the positive and negative peak values represents the detected central frequency. This thus allows the oscillator frequency to be adjusted to the desired frequency in the automatic frequency compensation (AFC) loop for data demodulation. Determination of the frequency deviation or shift is performed at a high frequency to enable adjustment of the oscillator frequency, and there is no provision for reducing the electric power consumption of the receiver, which is a drawback.

SUMMARY OF THE INVENTION

It is thus an object of the invention to provide an FSK radio frequency signal receiver, which is a high sensitivity receiver and can easily be configured to centre the intermediate signal frequency prior to a high sensitivity demodulation operation, and which overcomes the aforementioned drawbacks of the state of the art.

The invention therefore concerns an FSK radio frequency signal receiver, which includes a high sensitivity FSK radio frequency signal receiver, said receiver including:
- an antenna for receiving FSK radio frequency signals,
- at least one low noise amplifier for amplifying and filtering the signals picked up by the antenna,
- a local oscillator with a quartz resonator for supplying oscillating signals,
- at least one mixer unit for mixing the filtered and amplified incoming signals with the oscillating signals supplied by the local oscillator, in order to produce intermediate signals, whose frequency is equal to the difference between the frequency of the oscillating signals and a carrier frequency of the incoming signals,
- a broadband or polyphase filter for filtering the intermediate signals, and
- an intermediate signal sampler for supplying sampled intermediate signals to a high sensitivity demodulation stage, which supplies data signals, wherein the receiver also includes a processing and selection circuit, which is capable of performing at least one discrete Fourier transform on the basis of the sampled intermediate signals, in order to determine the difference between the frequency of a signal amplitude peak above a determined threshold and the expected frequency of the intermediate signals, to correct the frequency of the oscillating signals from the local oscillator, and arranged to demodulate the data from the sampled intermediate signals in the demodulation stage Specific embodiments of the receiver are defined in the dependent claims 2 to 9.

One advantage of this FSK radio frequency signal receiver according to the invention lies in the fact that it uses a circuit for processing the sampled intermediate signals. This processing circuit uses a discrete Fourier transform (DFT) to check the frequency of each power peak above a determined threshold. This discrete Fourier transform is fast and performed on a limited frequency band, for example around 200 kHz, centred on the central frequency of the intermediate signals. This limited frequency band is based on the possible frequency error of the local oscillator, which may be provided with an inexpensive quartz. Thus a significant reduction in power consumption is observed, compared to a fast Fourier transform (FFT), which processes the signals over the entire sampled bandwidth. With this DFT processing, it is possible to adjust the local oscillator frequency on the basis of the frequency of the incoming radio frequency signals, so as to adjust the central frequency of the intermediate signals. These FSK radio frequency signals are preferably low rate signals. This allows high sensitivity demodulation to be performed easily, given that with a low data or command rate, the power of the FSK incoming signals is concentrated around the modulation frequency deviation or shift.

Advantageously, once the frequency of the oscillating signals from the local oscillator has been adapted, it is possible to perform demodulation via the high sensitivity demodulation stage. This demodulation stage includes a first narrow band digital filter for filtering the sampled intermediate signals having a positive frequency deviation, and a second narrow band digital filter for filtering the sampled intermediate signals having a zero or negative frequency deviation. The output signals from the digital filters each pass, first of all, through an energy detector, before a subtraction is performed between the signals from the two digital filters, so as to provide data or command signals.

Advantageously, the high sensitivity demodulation stage includes a first DFT demodulator for demodulating the sampled intermediate signals having a positive frequency deviation, and a second DFT demodulator for demodulating the sampled intermediate signals having a zero or negative frequency deviation or shift. The DFT demodulator output signals are subsequently subtracted to provide data or command signals.

The invention therefore also concerns a method of activating the high sensitivity FSK radio frequency signal receiver, wherein the method includes a first series of steps with a succession of phases in time for the acquisition and discrete Fourier transform of the sampled intermediate signals, the first series of steps consisting in:
a) performing a first acquisition of the FSK radio frequency signals picked up by the receiver for frequency conversion in the mixer unit via the oscillating signals from the local oscillator, and sampling the intermediate signals at the mixer unit output, in order to produce first sampled intermediate signals,
b) performing a first discrete Fourier transform of the first sampled intermediate signals in the processing circuit,
c) performing a second acquisition of the FSK radio frequency signals picked up by the receiver for frequency conversion in the mixer unit via the oscillating signals from the local oscillator and for sampling the intermediate signals at the mixer unit output, in order to produce second sampled intermediate signals,
d) performing a second discrete Fourier transform of the second sampled intermediate signals in the processing circuit, and in that the method includes a second series of steps following the first series of steps, consisting in:
e) checking the results of the two discrete Fourier transforms in the selector, in order to compare the amplitude peaks detected above the determined threshold after the two discrete Fourier transforms, so as to remove the amplitude peaks of spurious signals and select the amplitude peaks of the right incoming FSK radio frequency signals, and
f) correcting the frequency of the oscillating signals from the local oscillator on the basis of the difference between the frequency of at least one selected amplitude peak and the expected intermediate signal frequency.

One advantage of the method according to the invention is that after at least one acquisition phase, wherein a certain number of points are acquired from the intermediate signals by the sampler, at least one discrete Fourier transform is performed, for example 1 bit DFT, on a limited frequency band. The discrete Fourier transform result(s) can be stored. A frequency check of the amplitude peak(s) above a determined threshold is performed in order to estimate the frequency error relative to an expected frequency with positive or negative frequency shift keying of the intermediate signals. A frequency correction is subsequently carried out in the local oscillator to adapt the oscillating signal frequency and recentre the intermediate signal frequency prior to high sensitivity demodulation.

Advantageously, a double acquisition by the intermediate signal sampler, and a double discrete Fourier transform of the sampled intermediate signals, are carried out at different periods. The two results of the discrete Fourier transform are stored. A search algorithm with n large vectors subsequently enables the amplitude peaks above a determined threshold to be compared to the two stored results to determine any spurious peaks in the incoming interfering signals. The oscillating signal frequency is corrected according to the different frequency amplitude peaks selected, in order to recentre the central frequency of the intermediate signals. Thus, high sensitivity demodulation of the sampled intermediate signals can be carried out.

BRIEF DESCRIPTION OF THE INVENTION

Figure 2:
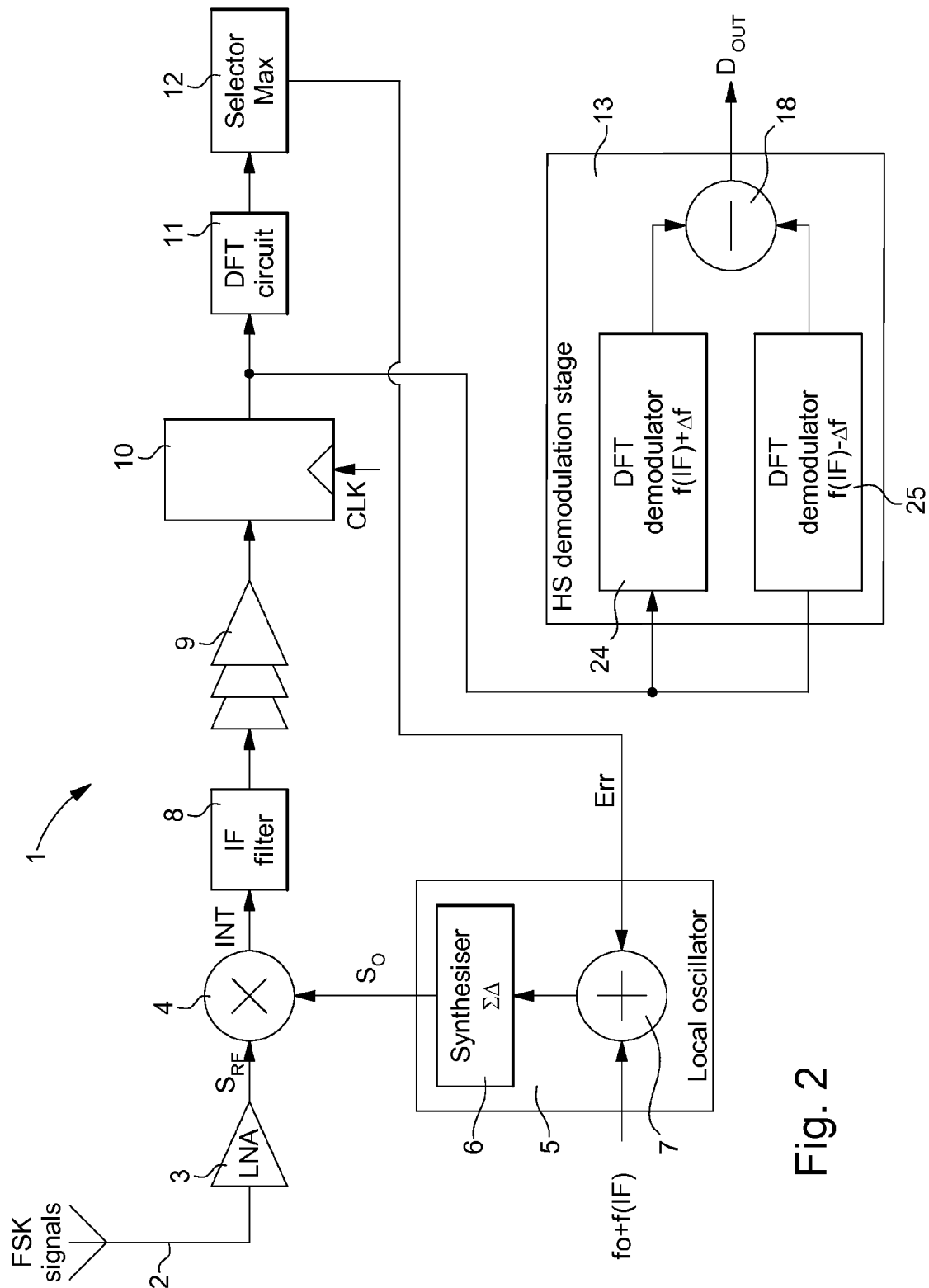
Figure 5A:
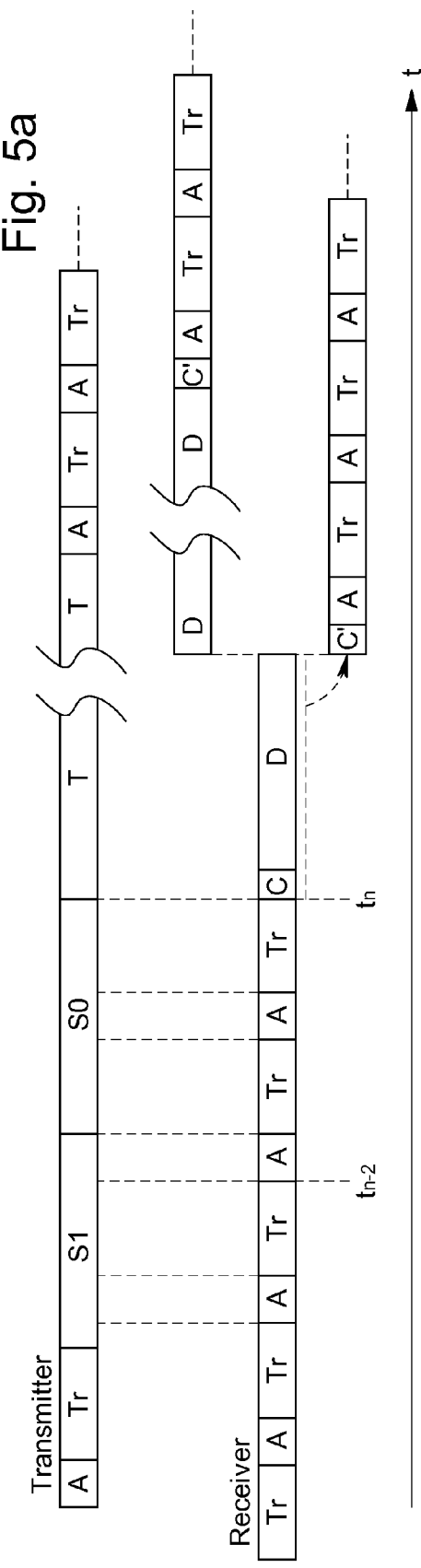
Figure 5B:
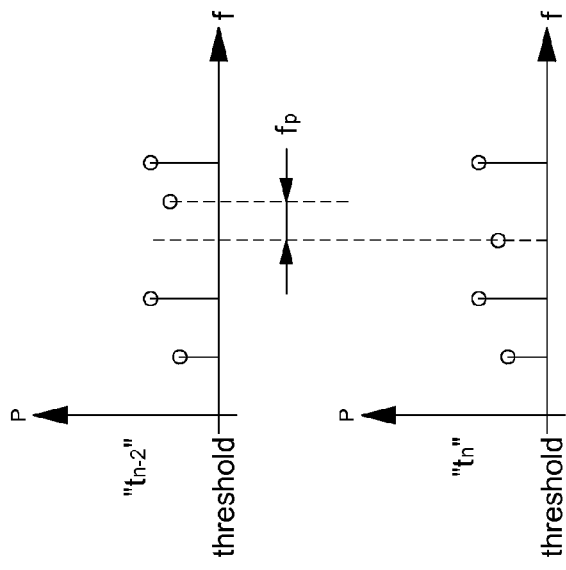

The objects, advantages and features of the high sensitivity FSK radio frequency receiver and the method of activating the same will appear more clearly in the following description, given on the basis of non-limiting embodiments illustrated by the drawings, in which:

FIG. 1 shows a simplified view of a first embodiment of the high sensitivity FSK radio frequency signal receiver according to the invention, FIG. 2 shows a simplified view of a second embodiment of the high sensitivity FSK radio frequency signal receiver according to the invention, FIG. 3 shows a simplified graph within the frequency domain of the sampled intermediate signal power, subsequent to a discrete Fourier transform in the FSK radio frequency signal receiver according to the invention, FIG. 4 shows a flow chart of the steps of the method of activating the FSK radio frequency signal receiver according to the invention, and FIGS. 5a and 5b show a simplified temporal graph of the signals from a transmitter and the signals picked up by the FSK radio frequency signal receiver according to the invention, in addition to a simplified graph of the power of the sampled intermediate signals within the frequency domain, subsequent to discrete Fourier transforms.

DETAILED DESCRIPTION OF THE INVENTION

In the following description, all those components of the FSK radio frequency signal receiver that are well known to those skilled in the art in this technical field will be described only in a simplified manner. Said FSK radio frequency signal receiver may advantageously be used for example in short range data or command transmission systems.

The high sensitivity FSK radio frequency signal receiver 1 is shown in a simplified manner in FIGS. 1 and 2. This FSK radio frequency signal receiver operates with an asynchronous approach. In order to be able to guarantee high sensitivity data reception, the receiver is configured to pick up FSK radio frequency signals, which are preferably low data rate signals, for example around 1 kbit per second. With the high sensitivity radio frequency signal receiver it is therefore possible to obtain a sensitivity of more than 17 dB with respect to a high data rate FSK radio frequency signal receiver, for example of 100 kbits per second.

Ideally, the high sensitivity receiver can operate with FSK modulation where the frequency deviation $\Delta f$ is close to the data rate Dp, so that for example $\Delta f/Dp=\frac{1}{2}$. However, if the data rate Dp has a value of 1 kbit per second, a corresponding frequency deviation $\Delta f$ of 500 Hz requires very large spectral purity for the synthesisers of a transmitter and receiver, and thus a very low phase noise. This is necessary for demodulation with a satisfactory signal noise ratio. The use of a higher $\Delta f/Dp$ ratio can overcome this problem.

The FSK radio frequency signal receiver 1 according to the invention is thus advantageously capable of picking up low data or command rate FSK radio frequency signals. With these low rate FSK radio frequency signals, the incoming signal power is generally concentrated on the (positive and negative) modulation frequency deviation $\Delta f$ relative to the signal carrier frequency $f_0$. Generally, in frequency modulation of the incoming signals, modulation state "1" is defined by adding the carrier frequency $f_0$ to the modulation frequency deviation $\Delta f$, which gives $f_0+\Delta f$, whereas modulation state "0" is defined by subtracting modulation frequency deviation $\Delta f$ from the carrier frequency $f_0$, which gives $f_0-\Delta f$. Of course, it is possible to envisage defining the modulation state "0" as the carrier frequency $f_0$, although the data modulation frequency of $f_0+\Delta f$ and $f_0-\Delta f$ is preferred.

As shown in FIGS. 1 and 2, the FSK radio frequency receiver 1 includes an FSK signal receiver antenna 2, with a carrier frequency which may be for example around 2.4 GHz. The FSK signals picked up by antenna 2 are amplified in a low noise amplifier (LNA) 3. This LNA 3 may also include a bandpass filter (not shown). These amplified and filtered FSK signals $S_{RF}$ are frequency converted in a mixer 4 via the oscillating signals $S_O$ supplied by the local oscillator 5, so as to produce simple intermediate signals INT or intermediate frequency quadrature signals f(IF). The intermediate frequency may preferably be on the order of 400 kHz, but this intermediate frequency may also be zero after direct baseband conversion by mixer 4.

These intermediate signals INT are filtered in a broad or polyphase bandpass filter 8 prior to passing through a conventional limiter amplifier 9. The bandwidth of filter 8 can be set for example at 600 kHz where the intermediate frequency is on the order of 400 kHz. This bandwidth of filter 8 is set to take account of the frequency error of the oscillating signals supplied by the local oscillator, or also the incoming FSK radio frequency signals. The oscillating signal frequency error may be on the order of ±100 kHz, since oscillating signals $S_O$ are generated by an inexpensive quartz resonator (±20 ppm), which is not shown.

The intermediate signals INT, filtered and amplified by limiter 9, are then sampled in a sampler 10, which is clocked by a clock signal CLK. The clock signal may have a frequency, for example, of 1.625 MHz. This clock signal CLK originates from a series of dividers (not shown), which are connected to a 26 MHz quartz resonator of local oscillator 5. The intermediate signals are thus sampled, so as to accumulate a number N of points to be processed in a processing and selection circuit 11. There may be 2048 points to be processed by the processing circuit.

On the basis of these 2048 points relating to the sampled intermediate signals, processing circuit 11 performs a discrete Fourier transform (DFT) to determine the frequency of the largest sampled intermediate signals, i.e. those with the largest amplitude above a determined threshold. The result of the discrete Fourier transform can be transmitted to a selector 12 at the output of processing circuit 11. This selector 12 may include a memory unit for storing the discrete Fourier transform carried out. However, the discrete Fourier transform following a first acquisition may also be stored in processing circuit 11.

As illustrated in FIG. 3, the discrete Fourier transform is advantageously performed in processing circuit 11 on a frequency band of between 300 kHz and 500 kHz with 200 bands at 1 kHz for example. The number of bands may of course be increased according to the desired frequency resolution. FIG. 3 shows a power peak above a determined threshold. A frequency error is observed relative to the expected frequency of the intermediate signals. Of course, in the case of frequency shift keying with frequency shift $\Delta f$, two power peaks should be shown above the determined threshold. With this discrete Fourier transform, a result can quickly be provided compared to a rapid Fourier transform (FFT), which processes the signals on all the sampled frequencies, in this case on 2048 bands.

The discrete Fourier transform checking circuit 11 may be at 1 bit. This DFT convolves the sampled intermediate signals with 200 sine and cosine vectors representative of the 200 frequency bands to be analysed. The results are then squared and added, in order to calculate the 200 corresponding power amplitude vectors. Only the N largest vectors higher than a parametrizable threshold are retained and stored in selector 12. The number N of vectors may be equal to 4.

Following reception of the result of the discrete Fourier transform of the sampled intermediate signals, selector 12 checks the frequency error relative to the expected central frequency of the intermediate signals, taking account of the positive and negative data modulation deviation $\Delta f$. A control signal Err is thus transmitted to local oscillator 5, to allow it to adapt the frequency of oscillating signals $S_O$. Correction of the oscillating signal frequency thus recentres the frequency of the intermediate signals INT supplied at the output of mixer 4. This operation of adapting the intermediate signal frequency is necessary in order to perform high sensitivity demodulation via HS demodulation stage 13, which is described hereinafter.

Selector 12, which is combined with DFT checking circuit 11, starts a search algorithm with n large vectors drawn from processing circuit 11. Preferably, a search algorithm with 4 vectors will be used, which is sufficient to enable the selection of at least one large vector for adapting the frequency of oscillating signals $S_O$ from local oscillator 5. The use of this algorithm is mainly for removing the spurious interfering signals which were picked up in addition to the FSK radio frequency signals. They may be, for example, signals transmitted for unlocking the doors of a car in proximity to the receiver.

As explained hereinafter with reference to FIG. 4 relating to the receiver activation method, a series of acquisitions of the sampled intermediate signals is performed until time $t_n$ and of corresponding discrete Fourier transforms. Selector 12 thus takes account of the two results of the discrete Fourier transform, which do not directly follow each other in time at $t_{n-2}$ and $t_n$. An additional acquisition and DFT processing interval is also provided between the two results to be checked. Finally, the two discrete Fourier transform results are compared, in order to remove the spurious interfering signals.

The "right" FSK radio frequency signals picked up by the receiver, are identified in the frequency domain by amplitude or power peaks at different frequencies above a determined threshold. At least two amplitude peaks representing the modulation frequencies in the intermediate signals are normally provided above a determined threshold, if, during the acquisition phases, the data alternates between state "1" and state "0". Following the two discrete Fourier transforms at $t_{n-2}$ and $t_n$, these amplitude peaks appear separated by a very precise frequency interval, which is only exceptionally the case for spurious interfering signals.

However, it is possible for a transmitter to transmit a series of "1" for a first acquisition by the receiver at time $t_{n-2}$, which gives only one detected amplitude peak ($f(IF)+\Delta f$) for the right incoming signals. Subsequently, the transmitter may transmit a series of "0" for a second acquisition by the receiver at time $t_n$, which gives only one other detected amplitude peak ($f(IF)-\Delta f$). Under these conditions, the frequency difference between the two peaks of the right signals is precisely equal to twice the FSK frequency deviation of the transmitter. This enables the local oscillator frequency to be corrected with an absolute error. However, the amplitude peaks of the sampled spurious signals only appear once at the same frequency following the two discrete Fourier transforms, and the frequency difference between them does not match the modulation frequency deviation. Consequently, it is easy to remove these spurious signals in selector 12.

Local oscillator 5 mainly includes a well known sigma-delta frequency synthesiser 6, which includes a 26 MHz quartz resonator, for example, (not shown) for supplying a reference signal in the phase lock loop of the synthesiser. The oscillating signals $S_O$ are supplied at the output of a well known voltage controlled oscillator VCO. Frequency synthesiser 6 is also controlled by a frequency programming signal. This programming signal originates from an adder 7, which adds a determined base frequency signal $f_0+f(IF)$, which is used each time the receiver is reset, and a control signal Err relating to the frequency error, which is determined in combination by the processing circuit 11 and selector 12.

Once the frequency of intermediate signals INT has been adapted by adapting the frequency of oscillating signals $S_O$ from local oscillator 5, high sensitivity data or command demodulation can be performed. This data or command demodulation is performed by HS demodulation stage 13.

In the first embodiment shown in FIG. 1, the HS demodulation stage 13 performs high sensitivity demodulation once the frequency of the intermediate signals has been properly adapted. This HS demodulation stage 13 includes a first narrow band digital filter 14 for filtering the sampled intermediate signals having a positive frequency deviation $f(IF)+\Delta f$, and a second narrow band digital filter 15 for filtering the sampled intermediate signals having a zero or negative frequency deviation $f(IF)-\Delta f$. The bandwidth of each digital filter may be on the order of 2 kHz. The filtered signals at the output of the first digital filter 14 pass through a first energy detector 16, whereas the filtered signals at the output of the second digital filter 15 pass through a second energy detector 17. A subtractor 18 is also provided at the output of detectors 16, 17 so that the signals at the output of the second energy detector 17 are subtracted from the signals at the output of the first energy detector 16. Data or command signals $D_{OUT}$ are supplied at the output of the subtractor with a sequence formed of 1 and −1.

In the second embodiment shown in FIG. 2, HS demodulation stage 13 includes a first DFT demodulator 24 for demodulating the sampled intermediate signals having a positive frequency deviation $f(IF)+\Delta f$, and a second DFT demodulator 25 for demodulating the sampled intermediate signals having a zero or negative frequency deviation $f(IF)-\Delta f$. The two DFT demodulators perform a well known sliding discrete Fourier transform with a number of bands reduced to single units within the frequency range of 2 kHz for example. The signals at the output of the second DFT demodulator 25 are subtracted in a subtractor 18 from the signals at the output of the first DFT demodulator 24, so as to provide data or command signals $D_{OUT}$.

FIG. 4 shows a flow chart of the method of activating the high sensitivity FSK radio frequency signal receiver according to the invention. A first phase of the method consists in checking the frequency of the intermediate signals, following frequency conversion of the FSK radio frequency signals in the mixer via the oscillating signals. After this check, a frequency correction can be performed on the local oscillator to recentre the oscillating signal frequency before high sensitivity data demodulation is carried out.

In step 30 a first acquisition is performed, for a duration of around 1.26 ms, of the FSK radio frequency signals picked up by the receiver, until the sampled intermediate signals are provided on 2048 points. The duration of acquisition may of course be longer to allow finer centring resolution. In step 31, a first discrete Fourier transform is performed on the sampled intermediate signals to supply a first transform result, normally to the selector, which stores this first result at time $t_{n-2}$. The duration of operation of this discrete Fourier transform may be around 2.52 ms.

In an alternative embodiment of the receiver, which takes account of any spurious signals picked up in the same way as the right FSK radio frequency signals, the process of acquisition and DFT processing is repeated in a loop after a check in step 32. The first and second results of the two discrete Fourier transforms, with an acquisition and DFT processing interval between the two results, are checked in the selector in step 32. To determine which are the right signals, a comparison is made of the maximum amplitude peaks above a determined threshold following the two discrete Fourier transforms. A search algorithm with n vectors, preferably 4 large vectors, is used in the selector for this purpose. Thus the spurious signals can be removed, to enable the selector to supply a control signal to the local oscillator in step 33 for the correction of the oscillating signal frequency. If no amplitude peak is detected above the determined threshold, the acquisition and DFT processing process is repeated in steps 30 to 32.

Once the frequency of the oscillating signals from the local oscillator has been able to be corrected in step 33, it is possible, in step 34, to perform data demodulation in the high sensitivity demodulation stage. In this demodulation stage, the sampled intermediate signals are for example filtered at frequency $f(IF)+\Delta f$ to supply first power signals P(f1) to the subtractor, and the sampled intermediate signals are sampled at frequency f(IF)−Δf to supply second power signals P(f2) to the subtractor. Thus a subtraction operation is performed on the power signals in step 35 to supply data signals $D_{OUT}$.

It is also possible, after HS demodulation step 34, to check the power signals P(f1) and P(f2) in step 36. If the result of the addition of these two power signals P(f1) and P(f2) is higher than a determined threshold, the coherence of the data received in the FSK radio frequency signals is determined in step 37. If, however, the result of the addition of the power signals is not higher than said defined threshold, the initial frequency of the oscillating signals from the local oscillator is re-established at step 38 before a new FSK radio frequency signal acquisition is performed in step 30.

The data coherence examined in step 37 essentially concerns the reliability or otherwise of the modulated data picked up by the FSK radio frequency signal receiver, in order to remove any spurious noise. If the data coherence is confirmed, high sensitivity demodulation is performed again in step 34. However, if the data is not coherent, the initial frequency of the oscillating signals from the local oscillator is re-established again in step 38 prior to a new FSK radio frequency signal acquisition in step 30.

For better visualisation in time of the various steps of the method of activating the FSK radio frequency signal receiver, reference can be made to FIGS. 5a and 5b.

FIG. 5a shows a simplified temporal graph of the signals from a transmitter and the signals picked up by the FSK radio frequency receiver according to the invention. FIG. 5b shows a simplified graph of the power of the sampled intermediate signals within the frequency domain following at least two discrete Fourier transforms separated in time.

At the start, a series of acquisition phases referenced A and discrete Fourier transforms referenced Tr, for example of the sampled intermediate signals, is performed in the transmitter and the receiver. The microprocessor of the transmitter controls transmission via an antenna of the FSK radio frequency signal transmitter. The transmitter first of all transmits a sequence of 10 bits in state "1" or having a well determined frequency deviation known to the receiver, referenced S1, at a low rate, for example on the order of 1.5 kbits per second. This corresponds to a duration of around 6.66 ms. During the transmission duration of this "1" sequence, the receiver performs a first effective acquisition of one part of the sequence, normally for a duration on the order of 1.26 ms or more. This acquisition of the sampled intermediate signals must correspond to signals at a frequency of f(IF)+Δf. A first discrete Fourier transform of these sampled intermediate signals is performed at the end of a duration on the order of 2.52 ms at time $t_{n-2}$. At this moment, the result of this first discrete Fourier transform is stored in the selector.

After this "1" sequence has been transmitted by the transmitter, a second 10 bit sequence in state "0" or having a well determined frequency deviation known to the receiver, referenced S0, with a duration equal to 6.66 ms, is transmitted by the transmitter. An intermediate acquisition and discrete Fourier transform phase in the receiver follows the first discrete Fourier transform phase. After the interval of the intermediate acquisition and DFT processing phase, a second effective acquisition of one part of this second sequence S0 starts. This second acquisition of the sampled intermediate signals must correspond to signals at a frequency of f(IF)−Δf or f(IF). A second discrete Fourier transform of these sampled intermediate signals is performed and stored in the selector of the receiver. At the end of this second signal sequence, the transmitter performs an effective data transmission referenced T. At the end of this data transmission, the transmitter returns, for example, to a receiving phase where there is a succession of acquisition and discrete Fourier transform phases, as for the receiver.

The selector continuously operates a search algorithm with n vectors and compares the two results of the discrete Fourier transforms which are stored and also separated by a time interval of one intermediate acquisition and DFT processing phase. Among the n most important vectors detected at instants $t_{n-2}$ and $t_n$, the algorithm tries to identify two separate candidates for the double frequency deviation Δf corresponding to the signal phase. This greatly reduces the probability of erroneous centring caused by spurious interfering signals separated by a frequency $f_p$, and allows amplitude peaks above the determined threshold to be selected from the right incoming FSK radio frequency signals. On the basis of the selected amplitude peaks, the selector transmits a control signal to the local oscillator to correct the frequency of the oscillating signals referenced C.

As soon as the oscillating signal frequency is corrected, a high sensitivity demodulation operation referenced D can start, as shown by the signals arranged on the top line of the receiver signals. At the end of the high sensitivity demodulation period, the oscillating signal frequency is re-set to the initial value, which is referenced C'. A new series of acquisition and discrete Fourier transform phases is carried out in the FSK radio frequency signal receiver.

However, in the receiver, after the frequency correction phase of the oscillating signals from the local oscillator, there is a time lag in the detection of the preamble of the incoming signals. If no correct preamble is detected, after a certain time, as shown on the signals of the bottom line of the receiver signals, the initial frequency of the oscillating signals is re-established before a new series of acquisition and discrete Fourier transform phases is performed in the FSK radio frequency signal receiver.

From the description that has just been given, several variants of the high sensitivity FSK radio frequency signal receiver can be devised by those skilled in the art without departing from the scope of the invention defined by the claims. Along the same lines, the receiver could also have been configured to allow transmission of modulated data signals as an acknowledgement of reception by the same antenna in a low rate mode. Several acquisitions and discrete Fourier transforms may also be performed before the frequency of the oscillating signals from the local oscillator is corrected. The frequency error detected between the transmitter and the receiver may also be used at a higher level by a communication system, for example to facilitate the search in the presence of strong interference or for the purpose of synchronisation. The discrete Fourier transform may be carried out on two frequency bands and using processing of several bits. Instead of a sigma delta synthesiser in the local oscillator, a fractional-N synthesiser or DDS may be used.

What is claimed is:

1. A high sensitivity FSK radio frequency signal receiver, said receiver including:
    an antenna for receiving FSK radio frequency signals,
    at least one low noise amplifier for amplifying and filtering the signals picked up by the antenna,
    a local oscillator with a quartz resonator for supplying oscillating signals,
    at least one mixer unit for mixing the filtered and amplified incoming signals with the oscillating signals supplied by the local oscillator, in order to produce intermediate signals, whose frequency is equal to the difference between the frequency of the oscillating signals and a carrier frequency of the incoming signals, a broadband or polyphase filter for filtering the intermediate signals, and
an intermediate signal sampler for supplying sampled intermediate signals to a high sensitivity demodulation stage, which supplies data signals,
wherein the receiver also includes a processing and selection circuit, which is capable of performing at least one discrete Fourier transform on the basis of the sampled intermediate signals, in order to determine the difference between the frequency of a signal amplitude peak above a determined threshold and the expected frequency of the intermediate signals, to correct the frequency of the oscillating signals from the local oscillator, and arranged to demodulate the data from the sampled intermediate signals in the demodulation stage,
wherein the high sensitivity FSK radio frequency signal receiver includes a selector at the output of the processing circuit, which receives one or several results per discrete Fourier transform of the sampled intermediate signals, which is performed in the processing circuit, and
wherein said selector is arranged for checking the frequency error relative to the expected frequency of the intermediate signals, taking account of the positive and/or negative data modulation deviation in the sampled intermediate signals, and for supplying a control signal to the local oscillator to correct the frequency of the oscillating signals according to the determined frequency error.

2. The high sensitivity FSK radio frequency signal receiver according to claim 1, wherein the selector includes a memory unit for storing the results of one or several discrete Fourier transforms of the sampled intermediate signals, which are performed in the processing circuit.

3. The high sensitivity FSK radio frequency signal receiver according to claim 2, wherein the selector is arranged to operate a search algorithm with n large vectors on the basis of the stored results of the discrete Fourier transforms performed in the processing circuit, the selector being arranged to compare amplitude peaks in the stored results that are above a determined threshold, so as to detect any spurious peak in incoming interfering signals, and arranged to select one or several amplitude peaks in the right incoming FSK radio frequency signals above the determined threshold, to determine the frequency error relative to the expected frequency of the intermediate signals, and the selector also being arranged to supply a control signal to the local oscillator for the frequency correction of the oscillating signals.

4. The high sensitivity FSK radio frequency signal receiver according to claim 1, wherein the local oscillator includes a sigma-delta frequency synthesiser, which includes a quartz resonator for supplying a reference signal in a phase lock loop and for supplying oscillating signals at the output of a voltage controlled oscillator, and wherein the local oscillator also includes an adder for adding a signal at a determined base frequency to initialise the oscillating signal frequency, and a control signal supplied by the selector depending upon the frequency error determined in the selector, the output of the adder being intended to control the frequency synthesiser in order to adapt the frequency of the oscillating signals.

5. The high sensitivity FSK radio frequency signal receiver according to claim 1, wherein the high sensitivity demodulation stage includes a first narrow band digital filter for filtering the sampled intermediate signals having a positive frequency deviation and a second narrow band digital filter for filtering the sampled intermediate signals having a zero or negative frequency deviation, wherein the signals supplied by the first digital filter pass through a first energy detector, wherein the signals supplied by the second digital filter pass through a second energy detector, and wherein a subtractor of the demodulation stage is arranged for subtracting the output signals of the second energy detector from the output signals of the first energy detector to supply data signals.

6. The high sensitivity FSK radio frequency signal receiver according to claim 5, wherein each narrow band digital filter is configured to have a bandwidth on the order of 2 kHz, to filter sampled intermediate signals originating from low rate FSK radio frequency signals picked up by the receiver.

7. A method of activating the high sensitivity FSK radio frequency signal receiver according to claim 1, wherein the method includes a first series of steps with a succession of phases in time for the acquisition and discrete Fourier transform of the sampled intermediate signals, the first series of steps consisting in:
a) performing a first acquisition of the FSK radio frequency signals picked up by the receiver for frequency conversion in the mixer unit via the oscillating signals from the local oscillator, and sampling the intermediate signals at the mixer unit output, in order to produce first sampled intermediate signals,
b) performing a first discrete Fourier transform of the first sampled intermediate signals in the processing circuit,
c) performing a second acquisition of the FSK radio frequency signals picked up by the receiver for frequency conversion in the mixer unit via the oscillating signals from the local oscillator and for sampling the intermediate signals at the mixer unit output, in order to produce second sampled intermediate signals,
d) performing a second discrete Fourier transform of the second sampled intermediate signals in the processing circuit, and
in that the method includes a second series of steps following the first series of steps, consisting in:
e) checking the results of the two discrete Fourier transforms in the selector, in order to compare the amplitude peaks detected above the determined threshold after the two discrete Fourier transforms, so as to remove the amplitude peaks of spurious signals and select the amplitude peaks of the right incoming FSK radio frequency signals, and
f) correcting the frequency of the oscillating signals from the local oscillator on the basis of the difference between the frequency of at least one selected amplitude peak and the expected intermediate signal frequency.

8. The method according to claim 7, wherein the results of the first and second discrete Fourier transforms are stored in the selector, which determines any large amplitude peaks above the determined threshold, in order to supply a control signal to the local oscillator to correct the frequency of the oscillating signals according to the difference between the frequency of at least one detected large amplitude peak and the expected intermediate signal frequency.

9. The method according to claim 7, wherein the intermediate signals are sampled in the sampler to supply sampled intermediate signals to the processing circuit on 2048 points.

10. The method according to claim 7, wherein the first acquisition and discrete Fourier transform phase of steps a) and b) is separated in time from the second acquisition and discrete Fourier transform phase of steps c) and d), by at least one intermediate phase of sampled intermediate signal acquisition and discrete Fourier transform.

11. The method according to claim 7, wherein the selector operates a search algorithm with n vectors, preferably 4 large vectors, to select any amplitude peaks above the determined threshold other than the amplitude peaks generated by spurious interfering signals.

12. The method according to claim 7, wherein each discrete Fourier transform is performed in the processing circuit on a frequency bandwidth centred on the expected intermediate signal frequency, and is less than 400 kHz, and preferably equal to 200 kHz with 200 bands of 1 kHz.

13. A high sensitivity FSK radio frequency signal receiver, said receiver including:
   an antenna for receiving FSK radio frequency signals,
   at least one low noise amplifier for amplifying and filtering the signals picked up by the antenna,
   a local oscillator with a quartz resonator for supplying oscillating signals,
   at least one mixer unit for mixing the filtered and amplified incoming signals with the oscillating signals supplied by the local oscillator, in order to produce intermediate signals, whose frequency is equal to the difference between the frequency of the oscillating signals and a carrier frequency of the incoming signals,
   a broadband or polyphase filter for filtering the intermediate signals, and
   an intermediate signal sampler for supplying sampled intermediate signals to a high sensitivity demodulation stage, which supplies data signals,
   wherein the receiver also includes a processing and selection circuit, which is capable of performing at least one discrete Fourier transform on the basis of the sampled intermediate signals, in order to determine the difference between the frequency of a signal amplitude peak above a determined threshold and the expected frequency of the intermediate signals, to correct the frequency of the oscillating signals from the local oscillator, and arranged to demodulate the date from the sampled intermediate signals in the demodulation stage,
   wherein the high sensitivity demodulation stage includes a first narrow band digital filter for filtering the sampled intermediate signals having a positive frequency deviation and a second narrow band digital filter for filtering the sampled intermediate signals having a zero or negative frequency deviation, wherein the signals supplied by the first digital filter pass through a first energy detector, wherein the signals supplied by the second digital filter pass through a second energy detector, and wherein a subtractor of the demodulation stage is arranged for subtracting the output signals of the second energy detector from the output signals of the first energy detector to supply data signals.

14. The high sensitivity FSK radio frequency signal receiver according to claims 13, wherein each narrow band digital filter is configured to have a bandwidth on the order of 2 kHz, to filter sampled intermediate signals originating from low rate FSK radio frequency signals picked up by the receiver.

* * * * *